(12) United States Patent
Xu et al.

(10) Patent No.: US 11,202,318 B2
(45) Date of Patent: Dec. 14, 2021

(54) INITIAL ACCESS METHOD AND APPARATUS

(71) Applicant: HUAWEI TECHNOLOGIES CO., LTD., Shenzhen (CN)

(72) Inventors: Kai Xu, Shenzhen (CN); Hongcheng Zhuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 16/078,025

(22) PCT Filed: Mar. 23, 2017

(86) PCT No.: PCT/CN2017/077791
§ 371 (c)(1),
(2) Date: Aug. 21, 2018

(87) PCT Pub. No.: WO2018/058917
PCT Pub. Date: Apr. 5, 2018

(65) Prior Publication Data
US 2021/0204323 A1 Jul. 1, 2021

(30) Foreign Application Priority Data
Sep. 29, 2016 (CN) .......................... 201610870481.0

(51) Int. Cl.
*H04W 74/08* (2009.01)
*H04W 72/04* (2009.01)
*H04W 74/00* (2009.01)

(52) U.S. Cl.
CPC ..... *H04W 74/0833* (2013.01); *H04W 72/046* (2013.01); *H04W 72/0453* (2013.01); *H04W 74/006* (2013.01); *H04W 74/0891* (2013.01)

(58) Field of Classification Search
CPC .......... H04W 74/0833; H04W 72/046; H04W 72/0453; H04W 74/006; H04W 74/0891;
(Continued)

(56) References Cited

U.S. PATENT DOCUMENTS

2013/0301567 A1 11/2013 Jeong et al.
2014/0010178 A1 1/2014 Yu et al.
(Continued)

FOREIGN PATENT DOCUMENTS

CN 104412519 A 3/2015
CN 105723639 A 6/2016
(Continued)

OTHER PUBLICATIONS

R1-167944 NTT DOCOMO et al."WF on NR initial access", 3GPP TSG RAN WG1 #86 ,Gothenburg, Sweden, Aug. 22-26, 2016,total 3 pages.
(Continued)

*Primary Examiner* — Thai Nguyen

(57) ABSTRACT

Embodiments of the present invention provide an initial access method and apparatus. The method includes: sending, by an access network device, a synchronization signal to user equipment by using at least two downlink beams, where the synchronization signal includes downlink beam indexes of the at least two downlink beams; receiving, by the access network device, a random access preamble sequence sent by the user equipment; and sending, by the access network device, a random access response RAR message to the user equipment by using at least two downlink beams, so that the user equipment completes initial access. In the initial access method provided in the embodiments of the present invention, a disadvantage of channel instability in a high-frequency transmission environment in a new radio system is
(Continued)

overcome, to improve initial access performance in the NR system and further improve user experience for the system.

20 Claims, 5 Drawing Sheets

(58) Field of Classification Search
CPC ......... H04W 72/0446; H04W 72/0413; H04W 74/004
See application file for complete search history.

(56) References Cited

U.S. PATENT DOCUMENTS

| | | | | |
|---|---|---|---|---|
| 2014/0177607 A1* | 6/2014 | Li | ................... | H04W 52/42 370/336 |
| 2016/0119958 A1* | 4/2016 | Tan | ................... | H04B 7/0617 370/336 |
| 2016/0227575 A1 | 8/2016 | Furuskog et al. | | |
| 2017/0367120 A1* | 12/2017 | Murray | ................ | H04B 7/0695 |
| 2020/0296765 A1* | 9/2020 | Kim | ................. | H04W 74/0833 |

FOREIGN PATENT DOCUMENTS

| | | |
|---|---|---|
| CN | 105812035 A | 7/2016 |
| CN | 106060943 A | 10/2016 |
| CN | 106256144 A | 12/2016 |
| KR | 101563469 B1 | 10/2015 |
| WO | 2015080649 A1 | 6/2015 |
| WO | 2016086144 A1 | 6/2016 |

OTHER PUBLICATIONS

R1-168260 NTT DOCOMO et al.,"WF on RACH procedure for NR",3GPP TSG RAN WG1 Meeting #86,Göteborg, Sweden Aug. 22-26, 2016,total 3 pages.

Notice of Allowance in CN Application No. 201780004603.6 dated Feb. 25, 2021, 4 pages.

* cited by examiner

INITIAL ACCESS METHOD AND APPARATUS

CROSS-REFERENCE TO RELATED APPLICATIONS

This application is a national stage of International Application No. PCT/CN2017/077791, filed on Mar. 23, 2017, which claims priority to Chinese Patent Application No. 201610870481.0, filed on Sep. 29, 2016. Both of the aforementioned applications are hereby incorporated by reference in their entireties.

TECHNICAL FIELD

The present invention relates to the communications field, and in particular, to an initial access method and apparatus.

BACKGROUND

In a conventional Long Term Evolution (Long Term Evolution, LTE) mobile communications system, that user equipment (User Equipment) initially accesses the system mainly includes: The user equipment performs initial synchronization and cell search; an access network device (Access Network Device) sends a basic system message, to be specific, a system information block (System Information Block, SIB) message; and the user equipment initiates a random access process.

In a process in which the user equipment performs initial synchronization and cell search, the user equipment may implement downlink coarse time synchronization and coarse frequency synchronization based on a primary synchronization signal (Primary Synchronization Signal, PSS) and a secondary synchronization signal (Secondary Synchronization Signal, SSS), further implement symbol synchronization and frame synchronization, and obtain information such as a cyclic prefix and a cell identifier. After the access network device sends the basic system message, the user equipment obtains a network configuration message for uplink random access by receiving and reading the basic system message. The user equipment obtains resource configuration information for uplink random access based on the basic system message provided by the access network device, and initiates the random access process. Uplink random access processes are classified into two forms: a competition random access process and a non-competition random access process. The competition-based random access process includes: The user equipment sends a random access preamble (Random Access Preamble, RAP) sequence to the access network device, the access network device sends a random access response (Random Access Response, RAR) to the user equipment, the user equipment sends a message 3 (Message 3, MSG 3) to the access network device, and the access network device returns a message 4 (Message 4, MSG 4) to the user equipment for competition resolution, to complete the uplink random access process.

However, currently, to send a downlink synchronization signal SS, the access network device performs single beamforming (Beamforming) and performs beam sweeping (Beam Sweeping) in time domain. The user equipment performs sweeping on a receiving beam, and receives and processes the downlink synchronization signal SS after the beam is synchronized. In the uplink random access process, similarly, single beamforming is performed, beam sweeping is performed in time domain, and after beams of the access network device and the user equipment are synchronized, the access network device further receives the RAP. Consequently, an uplink random access time is prolonged. The beam synchronization takes a relatively long time, and a single beam cannot ensure stability of the system.

In addition, currently, a single RAR message is sent and received in a fixed window. Once receiving fails or a receiving clock expires, sending and receiving of the RAR message need to be re-performed. Therefore, stability of receiving the RAR message in the system is poor.

In addition, for a new radio (New Radio, NR) system, the system operates in a high frequency band, for example, a frequency band of 6 GHz or above, or even frequency bands of 40 GHz and 100 GHz. In a high-frequency condition, the system has a relatively poor wireless environment and a relatively high path loss, and a link is easily blocked by an obstacle. This easily causes great impact on system link stability.

SUMMARY

This application provides an initial access method and apparatus. In the method, a disadvantage of channel instability in a high-frequency transmission environment in a new radio system can be overcome, to improve initial access performance in the NR system and further improve user experience for the system.

According to a first aspect, an embodiment of this application provides an initial access method. The method may include:

sending, by an access network device, a synchronization signal to user equipment by using at least two downlink beams, where the synchronization signal includes downlink beam indexes of the at least two downlink beams; receiving, by the access network device, a random access preamble sequence sent by the user equipment; and sending, by the access network device, a random access response RAR message to the user equipment by using at least two downlink beams, and subsequently receiving an MSG 3 message sent by the user equipment and sending an MSG 4 message to the user equipment, so that the user equipment completes initial access.

In the initial access method provided in this embodiment of this application, the synchronization signal and the RAR message each are sent to the user equipment by using a plurality of downlink beams, to enhance sending of the synchronization signal and the RAR message. This also improves reliability of receiving a synchronization message and the RAR message by the user equipment, further improves initial access performance in an NR system, and further improves user experience for the system.

With reference to the first aspect, in a first possible implementation of the first aspect, the sending, by an access network device, a synchronization signal to user equipment by using at least two downlink beams includes:

sending, by the access network device, the synchronization signal to the user equipment in a plurality of downlink sending timeslots by using the at least two downlink beams. This improves a coverage area of the synchronization signal, fully uses a beam diversity gain and a time diversity gain, and enhances power used by the user equipment to receive the synchronization signal.

With reference to the first aspect, in a second possible implementation of the first aspect, the sending, by an access network device, a synchronization signal to user equipment by using at least two downlink beams includes:

sending, by the access network device, the synchronization signal to the user equipment at a plurality of frequency domain resource locations by using the at least two downlink beams. This improves a frequency diversity gain of the synchronization signal, and enhances power used by the user equipment to receive the synchronization signal.

With reference to the second possible implementation of the first aspect, in a third possible implementation of the first aspect, the plurality of frequency domain resource locations are preset fixed frequency domain resource locations.

With reference to the first to the third possible implementations of the first aspect, in a fourth possible implementation of the first aspect, before the receiving, by the access network device, a random access preamble sequence sent by the user equipment, the method further includes:

sending, by the access network device, information about a relationship between the downlink beam index and an uplink random access resource to the user equipment, where the uplink random access resource includes at least one of the random access preamble sequence, a timeslot for uplink sending of the random access preamble sequence, and an uplink beam index of an uplink sending beam, and the uplink sending beam is used by the user equipment to send the random access preamble sequence.

In this embodiment of this application, the information about the relationship between the downlink beam index and the uplink random access resource may specifically include: information about a relationship between the downlink beam index and the random access preamble sequence or a random access preamble sequence index, information about a relationship between the downlink beam index and the timeslot for uplink sending of the random access preamble sequence, information about a relationship between the downlink beam index and the uplink beam index of the uplink sending beam, or the like.

After receiving the information about the relationship between the downlink beam index and the uplink random access resource, the user equipment determines, based on the information about the relationship between the downlink beam index and the random access preamble sequence or the random access preamble sequence index, the random access preamble sequence to be sent by the user equipment; or the user equipment determines, based on the information about the relationship between the downlink beam index and the timeslot for uplink sending of the random access preamble sequence, a timeslot for sending the random access preamble sequence; or the user equipment determines, based on the information about the relationship between the downlink beam index and the uplink beam index of the uplink sending beam, an uplink beam used to send the random access preamble sequence, or the like. This further improves an initial access speed of the user equipment.

With reference to the fourth possible implementation of the first aspect, in a fifth possible implementation of the first aspect, the sending, by the access network device, information about a relationship between the downlink beam index and an uplink random access resource to the user equipment includes:

sending, by the access network device, the information about the relationship between the downlink beam index and the uplink random access resource to the user equipment by using a broadcast message or dedicated signaling of the user equipment.

With reference to any one of the first aspect or the foregoing possible implementations of the first aspect, in a sixth possible implementation of the first aspect, the sending, by the access network device, a random access response RAR message by using at least two downlink beams includes:

sending, by the access network device, the RAR message in a preset time window by using the at least two downlink beams.

With reference to the sixth possible implementation of the first aspect, in a seventh possible implementation of the first aspect, the sending the RAR message in a preset time window includes:

sending the RAR message for a plurality of times in the preset time window.

With reference to any one of the first aspect or the foregoing possible implementations of the first aspect, in an eighth possible implementation of the first aspect, the sending, by the access network device, a random access response RAR message by using at least two downlink beams includes:

sending, by the access network device, the RAR message by using at least one transmit receive point, where each of the plurality of transmit receive points sends the RAR message by using a plurality of downlink beams.

With reference to any one of the first aspect or the foregoing possible implementations of the first aspect, in a ninth possible implementation of the first aspect, the method further includes:

sending, by the access network device, configuration information to the user equipment, where the configuration information includes at least one of information about the plurality of frequency domain resource locations, information about the preset time window, and information about a quantity of times of sending the RAR message in the preset time window.

According to a second aspect, an embodiment of this application provides an initial access method. The method includes:

receiving, by user equipment, a synchronization signal sent by an access network device by using at least two downlink beams, where the synchronization signal includes downlink beam indexes of the at least two downlink beams; sending, by the user equipment, a random access preamble sequence to the access network device based on the synchronization signal; and receiving, by the user equipment, a random access response RAR message sent by the access network device by using at least two downlink beams, so that the user equipment completes initial access.

In the initial access method provided in this embodiment of this application, the user equipment receives the synchronization signal and the RAR message each of which is sent by the access network device by using a plurality of downlink beams. This improves reliability of receiving the synchronization signal and the RAR message by the user equipment, further improves initial access performance in an NR system, and further improves user experience for the system.

With reference to the second aspect, in a first possible implementation of the second aspect, the receiving, by user equipment, a synchronization signal sent by an access network device by using at least two downlink beams includes:

receiving, by the user equipment, the synchronization signal sent by the access network device in a plurality of downlink sending timeslots by using the at least two downlink beams. This implements a beam diversity gain. In addition, the synchronization signal is sent in different timeslots. This improves a coverage area of the synchronization signal, and enhances power used by the user equipment to receive the synchronization signal.

With reference to the second aspect, in a second possible implementation of the second aspect, the receiving, by user equipment, a synchronization signal sent by an access network device by using at least two downlink beams includes: receiving, by the user equipment, the synchronization signal sent by the access network device at a plurality of frequency domain resource locations by using the at least two downlink beams. This implements a beam diversity gain. In addition, the synchronization signal is sent at different frequency domain resource locations. This enhances power used by the user equipment to receive the synchronization signal.

With reference to the second possible implementation of the second aspect, in a third possible implementation of the second aspect, the plurality of frequency domain resource locations are preset fixed frequency domain resource locations.

With reference to any one of the second aspect or the foregoing possible implementations of the second aspect, in a fourth possible implementation of the second aspect, before the sending, by the user equipment, a random access preamble sequence to the access network device based on the synchronization signal, the method may further include:

sending, by the user equipment, the random access preamble sequence to the access network device based on the synchronization signal and information about a relationship between the downlink beam index and an uplink random access resource.

With reference to the fourth possible implementation of the second aspect, in a fifth possible implementation of the second aspect, the uplink random access resource includes the random access preamble sequence or a random access preamble sequence index; and the sending, by the user equipment, the random access preamble sequence to the access network device based on the synchronization signal and information about a relationship between the downlink beam index and an uplink random access resource includes:

determining, by the user equipment based on information about a relationship between the synchronization signal and the random access preamble sequence or the random access preamble sequence index, the random access preamble sequence to be sent by the user equipment to the access network device; and sending, by the user equipment, the random access preamble sequence to the access network device.

In the initial access method provided in this embodiment of this application, different user equipments can use different random access preamble sequences. This reduces a collision probability of competition random access and improves an access speed of the user equipment.

With reference to the fourth possible implementation of the second aspect, in a sixth possible implementation of the second aspect, the uplink random access resource includes a timeslot for uplink sending of the random access preamble sequence, and the method further includes:

determining, by the user equipment based on the synchronization message and information about a relationship between the downlink beam index and the timeslot for uplink sending of the random access preamble sequence, a timeslot for sending the random access preamble sequence; and sending, by the user equipment, the random access preamble sequence in the timeslot.

In the initial access method provided in this embodiment of this application, the user equipment can be prevented from resource collision during uplink sending of the random access preamble sequence, and uplink sending processes are distinguished from each other in time domain, so that a channel access speed of the user equipment is improved.

With reference to the fourth possible implementation of the second aspect, in a seventh possible implementation of the second aspect, the uplink random access resource further includes an uplink beam index of an uplink sending beam, and the method further includes:

determining, by the user equipment, the uplink sending beam based on the synchronization message and information about a relationship between the downlink beam index and the uplink beam index of the uplink sending beam; and sending, by the user equipment, the random access preamble sequence by using the uplink sending beam.

In the initial access method provided in this embodiment of this application, the user equipment can quickly determine the uplink sending beam based on information about a relationship between the downlink beam index and an uplink beam index of the sent random preamble sequence, and does not need to perform a beam sweeping process. This further improves an uplink access speed of the user equipment and shortens an initial access time of the user equipment.

With reference to any one of the second aspect or the foregoing possible implementations of the second aspect, in an eighth possible implementation of the second aspect, the method may further include:

receiving, by the user equipment, the information that is about the relationship between the downlink beam index and the uplink random access resource and that is sent by the access network device.

With reference to any one of the second aspect or the foregoing possible implementations of the second aspect, in a ninth possible implementation of the second aspect, the receiving, by the user equipment, a random access response RAR message sent by the access network device by using at least two downlink beams includes:

receiving, by the user equipment, the RAR message sent by the access network device in a preset time window by using the at least two downlink beams.

With reference to the ninth possible implementation of the second aspect, in a tenth possible implementation of the second aspect, the receiving, by the user equipment, the RAR message sent by the access network device in a preset time window by using the at least two downlink beams includes:

receiving, by the user equipment, the RAR message sent by the access network device for a plurality of times in the preset time window.

With reference to any one of the second aspect or the foregoing possible implementations of the second aspect, in an eleventh possible implementation of the second aspect, the receiving, by the user equipment, a random access response RAR message sent by the access network device by using at least two downlink beams includes:

receiving, by the user equipment, the RAR message sent by the access network device by using a plurality of transmit receive points, where each of the plurality of transmit receive points sends the RAR message by using at least two downlink beams.

With reference to any one of the seventh to the eleventh possible implementations of the second aspect, in a twelfth possible implementation of the second aspect, the receiving, by the user equipment, the information that is about the relationship between the downlink beam index and the uplink random access resource and that is sent by the access network device includes:

receiving, by the user equipment, the information that is about the relationship between the downlink beam index and the uplink random access resource and that is sent by the access network device by using a broadcast message or dedicated signaling of the user equipment.

With reference to any one of the second aspect or the foregoing possible implementations of the second aspect, in a thirteenth possible implementation of the second aspect, the method includes:

receiving, by the user equipment, configuration information sent by the access network device, where the configuration information includes at least one of information about the plurality of frequency domain resource locations, information about the preset time window, and information about a quantity of times of receiving the RAR message in the preset time window.

According to a third aspect, an embodiment of this application provides an access network device, and the access network device has a function of implementing a behavior of the access network device in the foregoing method embodiment. The function may be implemented by hardware, or may be implemented by hardware by executing corresponding software. The hardware or software includes one or more modules corresponding to the foregoing function.

According to a fourth aspect, an embodiment of this application provides user equipment, and the user equipment has a function of implementing a behavior of the user equipment in the foregoing method embodiment. The function may be implemented by hardware, or may be implemented by hardware by executing corresponding software. The hardware or software includes one or more modules corresponding to the foregoing function.

According to a fifth aspect, an embodiment of this application provides an apparatus. The apparatus may be an access network device, and the access network device includes a transmitter and a receiver. The transmitter and the receiver are configured to: support communication between the access network device and user equipment, for example, sending a synchronization signal and an RAR message to the user equipment and receiving information such as a random access preamble sequence sent by the user equipment. In a possible design, the access network device may further include a processor. The processor is configured to provide support for the access network device to execute a corresponding function in the foregoing method, for example, process data and/or information related to the foregoing method. In a possible design, the access network device may further include a memory. The memory is configured to be coupled to the processor and store a program instruction and data that are necessary for the access network device.

According to a sixth aspect, an embodiment of this application provides user equipment. The user equipment includes a receiver and a transmitter. The transmitter and the receiver are configured to support communication between the user equipment and the access network device. The receiver is configured to receive information sent by the access network device, and the transmitter is configured to send data, information, and the like to the access network device. In a possible design, the user equipment may further include a processor, configured to process information designed in the foregoing method. In a possible design, the user equipment may further include a memory. The memory is configured to be coupled to the processor and store a program instruction and data that are necessary for the user equipment.

According to a seventh aspect, an embodiment of this application provides a computer storage medium, configured to store a computer software instruction used by the foregoing access network device. The computer software instruction includes a program designed for executing the foregoing aspects.

According to an eighth aspect, an embodiment of this application provides a computer storage medium, configured to store a computer software instruction used by the foregoing user equipment. The computer software instruction includes a program designed for executing the foregoing aspects.

According to the initial access method and apparatus provided in the embodiments of this application, the synchronization signal and an RAR signal are enhanced, stability of receiving the synchronization signal and the RAR message by the user equipment is improved, and a disadvantage of channel instability in a high-frequency transmission environment in the new radio system is overcome, so that initial access performance in the NR system is improved, and user experience for the system is further improved.

DESCRIPTION OF EMBODIMENTS

The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly.

An access network device (Access Network Device) in the embodiments of the present invention is an apparatus that is deployed in a radio access network and that is configured to provide a wireless communication function for user equipment (User Equipment, UE). The access network device may include various forms such as a macro base station, a micro base station, a relay node, and an access point. In systems using different radio access technologies, names of a device that has an access network device function may be different. For example, in an LTE network, the device is referred to as an evolved NodeB (English: evolved NodeB, eNB or eNodeB), and in a fifth generation 5G network or an NR network, the device is referred to as a new radio NodeB (English: new radio NodeB, NR-NB or gNB). For ease of description, in the embodiments of the present invention, apparatuses that provide the wireless communication function for the user equipment are collectively referred to as the access network device.

The user equipment in the embodiments of the present invention may also be referred to as terminal equipment (Terminal Equipment). The user equipment may include: a mobile phone, a tablet computer, a personal digital assistant (Personal Digital Assistant, PDA), a point of sale (Point of Sale, POS), an in-vehicle computer, and the like. This is not limited in the embodiments of the present invention. For ease of description, in the embodiments of the present invention, the foregoing devices are collectively described as the user equipment.

An initial access method and apparatus provided in the embodiments of the present invention may be applied to an initial access scenario of an NR system. A synchronization signal sent by the access network device to the user equipment is enhanced, and at least one of an RAR message and a broadcast system message sent by the access network device to the user equipment is enhanced, to improve performance of an initial access process of the user equipment in the entire NR system and shorten a time of initially accessing the NR system by the user equipment.

The following describes the technical solutions in the embodiments of the present invention with reference to the accompanying drawings in this specification.

Figure 1:
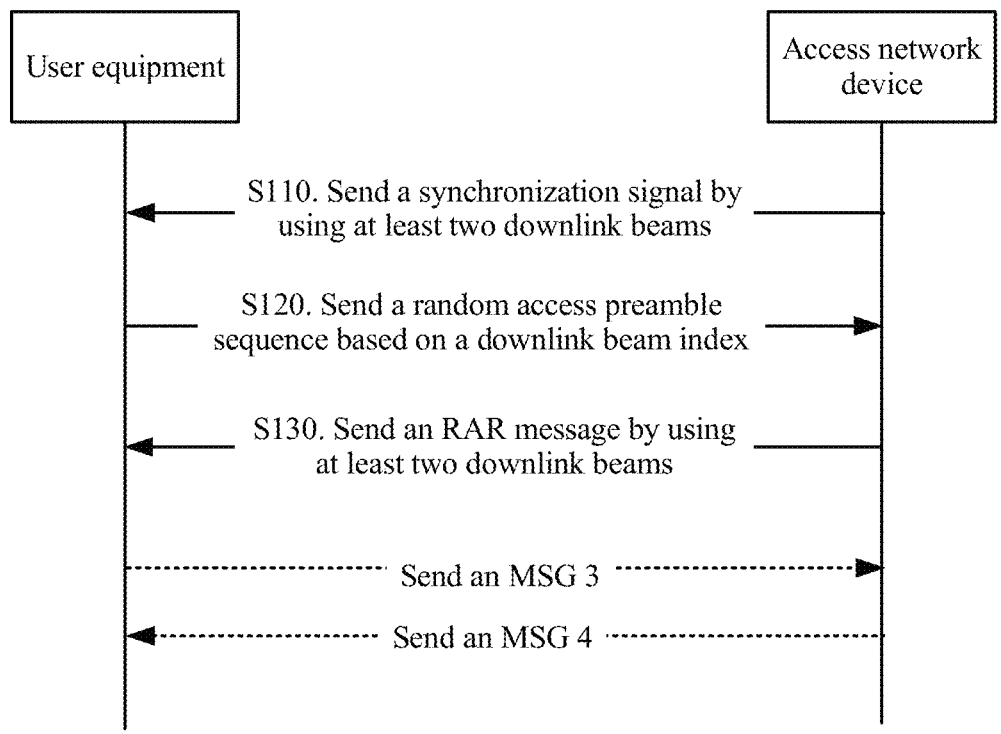
FIG. 1 is a flowchart of an initial access method according to an embodiment of the present invention.

FIG. 1 is a schematic flowchart of an initial access method according to an embodiment of this application. As shown in FIG. 1, the method may include the following steps.

S110. An access network device sends a synchronization signal to user equipment by using at least two downlink beams.

The synchronization signal may include downlink beam indexes of the at least two downlink beams for sending the synchronization signal.

Figure 2:
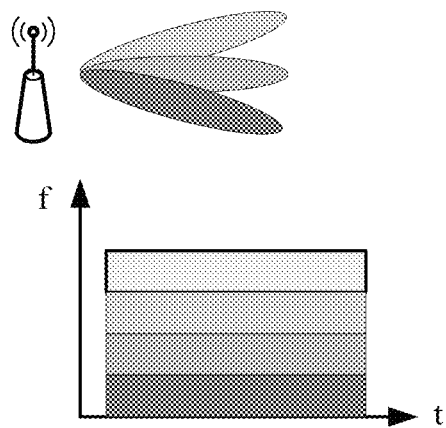
FIG. 2 is a schematic diagram of a synchronization signal sending manner according to an embodiment of the present invention.

To enhance performance of an initial access process in an NR system and shorten an initial access time of the user equipment, in this embodiment of the present invention, the synchronization signal may be enhanced. In addition, to improve reliability of receiving the synchronization signal by the user equipment, enhancement of the synchronization signal may be implemented in the following manner:

In an embodiment of the present invention, the access network device may send a same synchronization signal at different frequency domain resource locations by using different beams (as shown in FIG. 2), to improve a frequency diversity gain of receiving the synchronization signal by the user equipment, and achieve a beam diversity effect, thereby enhancing signal power used by the user equipment to receive the synchronization signal, and improving reliability of receiving the synchronization signal by the user equipment.

In this embodiment of the present invention, a frequency domain resource location in the different frequency domain resource locations at which the synchronization signal is sent may be configured by using a system message or may be obtained through system pre-configuration. In addition, to ensure that complexity of performing blind detection by the user equipment can be reduced, in an embodiment of the present invention, a plurality of frequency domain resource locations at which the synchronization signal is sent may be configured within one or more fixed frequency domain resource ranges, so that the user equipment performs blind detection only within a configured frequency domain resource range, reducing the complexity of performing blind detection by the user equipment, and further shortening the initial access time of the user equipment.

Figure 3:
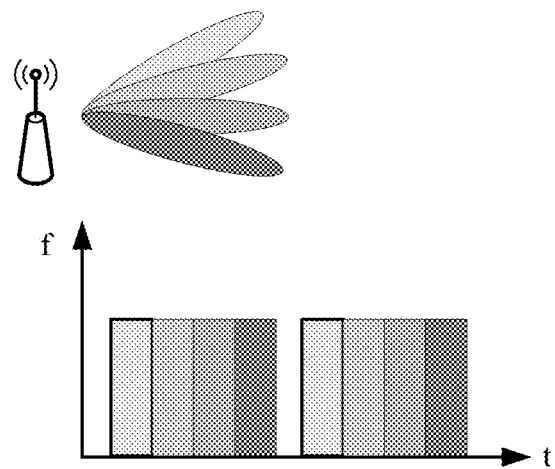
FIG. 3 is a schematic diagram of another synchronization signal sending manner according to an embodiment of the present invention.

In another embodiment of the present invention, the access network device may send a same synchronization signal in different timeslots in time domain by using different beams (as shown in FIG. 3), to improve a coverage area of the synchronization signal. When receiving a synchronization signal, the user equipment may perform combination processing on synchronization signals of a plurality of beams and timeslots, to fully use a time diversity gain and a beam diversity gain, enhance signal power used by the user equipment to receive the synchronization signal, and improve reliability of receiving the synchronization signal by the user equipment.

S120. The user equipment sends a random access preamble sequence to the access network device based on the downlink beam index.

The user equipment receives the synchronization signal sent by the access network device, completes downlink coarse time synchronization and coarse frequency synchronization, further implements symbol synchronization and frame synchronization, and obtains information such as a cyclic prefix and a message ID. Then, the user equipment obtains a network configuration message for uplink random access based on received basic system information, and sends the random access preamble sequence to the access network device by using a physical random access channel (Physical Random Access Channel, PRACH).

In this embodiment of the present invention, a process in which the user equipment completes the downlink coarse time synchronization and the coarse frequency synchronization based on the synchronization signal is the same as a process in which user equipment completes downlink coarse time synchronization and coarse frequency synchronization in an initial access process in an existing LTE system based on the synchronization signal. For brevity of description, details are not described herein.

Figure 7:
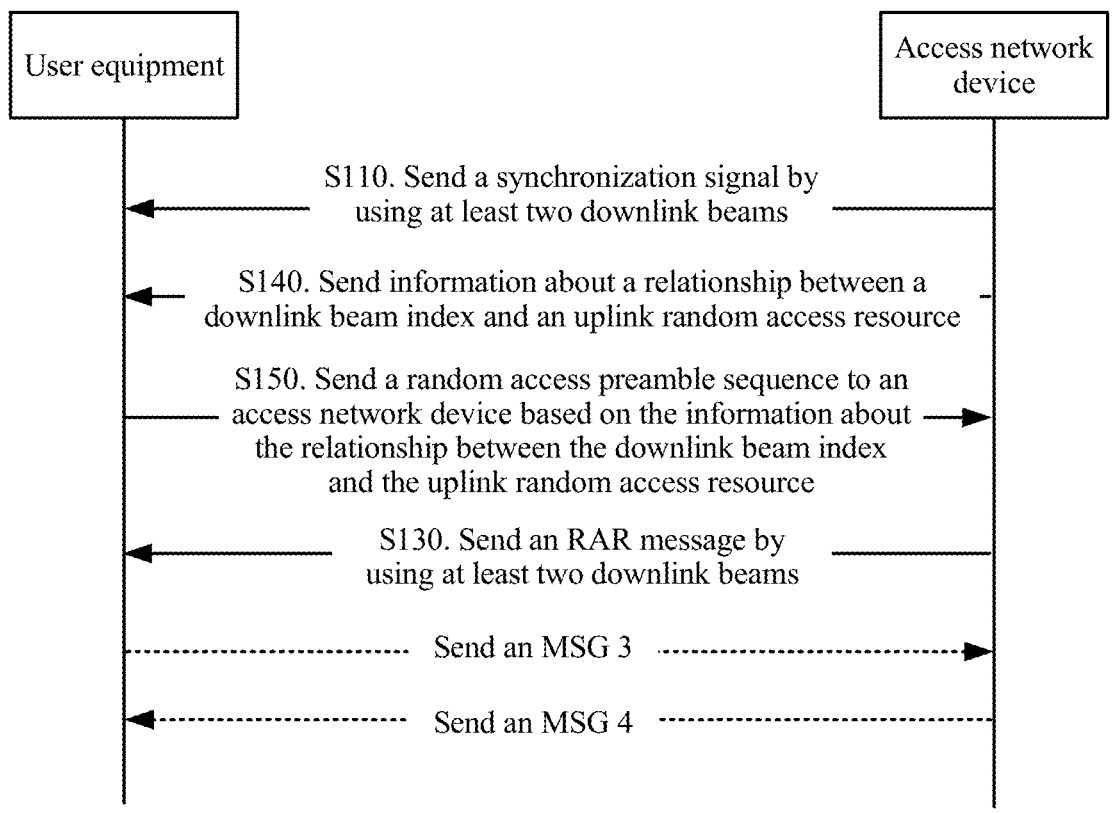
FIG. 7 is a flowchart of another initial access method according to an embodiment of the present invention.

For a specific process in which the user equipment sends the random access preamble sequence to the access network device, refer to a description of FIG. 7.

S130. The access network device sends a random access response RAR message to the user equipment by using at least two downlink beams.

In an embodiment of the present invention, after receiving the random access preamble sequence sent by the user equipment, the access network device may simultaneously send the RAR message to the user equipment by using a plurality of downlink beams according to a beam diversity mechanism, to improve reliability of receiving the RAR message by the user equipment.

Figure 4:
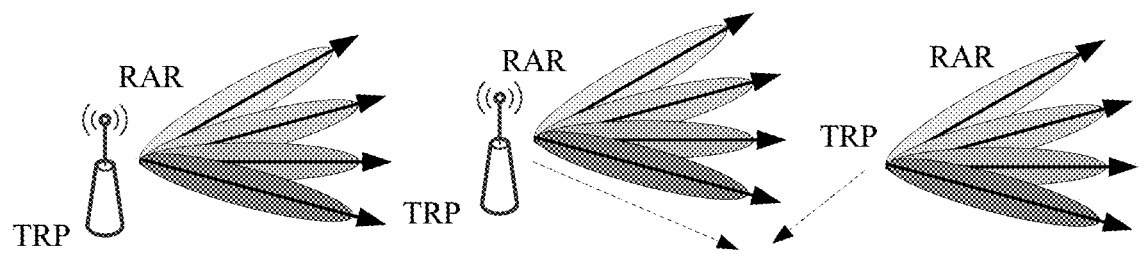
FIG. 4 is a schematic diagram illustrating that a plurality of transceiver points cooperate in sending an RAR message according to an embodiment of the present invention.

In another embodiment of the present invention, as shown in FIG. 4, the access network device may use a plurality of transmit receive points (Transmit Receive Point, TRP) to jointly transmit a same RAR message. In other words, the access network device may send the RAR message to the user equipment by using the plurality of TRPs. Each TRP may send the RAR message to the user equipment by using a plurality of beams. In this way, reliability of receiving the RAR message by the user equipment is improved.

Figure 5:
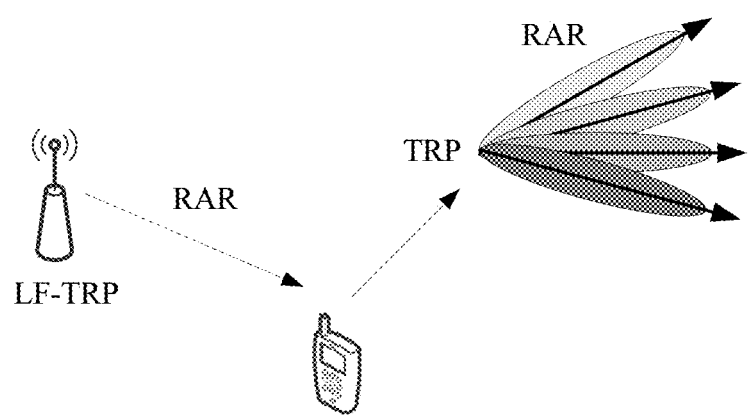
FIG. 5 is a schematic diagram illustrating that an RAR message is sent in a high frequency band with assistance of a low frequency band according to an embodiment of the present invention.

Although the NR system operates in a high frequency band, in this embodiment of the present invention, a low frequency band may be used for assistance in a scenario in which the system operates in the high frequency band. As shown in FIG. 5, the access network device transmits the RAR message in the low frequency band, to improve reliability of receiving the RAR message by the user equipment.

Figure 6:
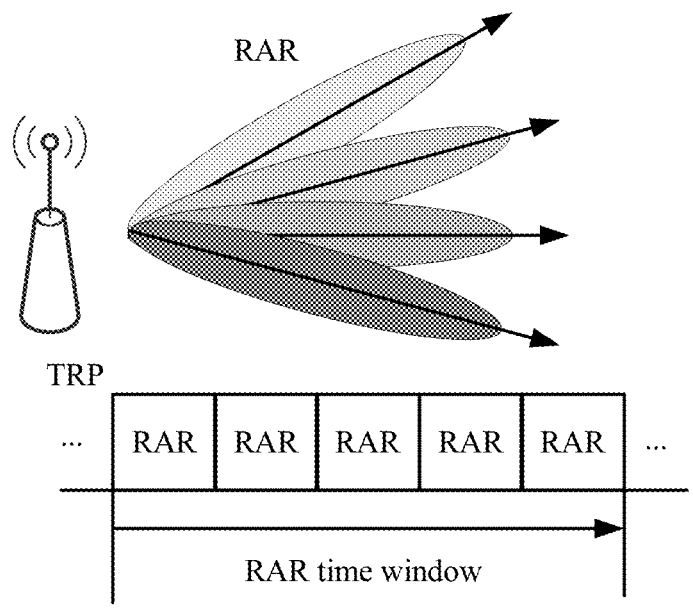
FIG. 6 is a schematic diagram illustrating that an RAR message is sent in a fixed time window according to an embodiment of the present invention.

As shown in FIG. 6, if there is no scenario in which the system operates in the high frequency band with assistance of the low frequency band, in this embodiment of the present invention, a specific time window for sending the RAR message may be configured, and the access network device sends the RAR message to the user equipment in the specific time window.

In this embodiment of the present invention, a quantity of times of sending the RAR message in the specific time window may be further configured, and the access network device sends the RAR message to the user equipment for a plurality of times in the specific time window. An increase in the quantity of times of sending the RAR message improves reliability of receiving the RAR message by the user equipment.

In other words, the time window in which the user equipment receives the RAR message sent by the access network device is configured, and the user equipment receives, in the configured specific time window, the RAR message sent by the access network device.

In this embodiment of the present invention, the time window in which the access network device sends the RAR message and information about the quantity of times of sending the RAR message in the time window are configured, and the access network device may send the configured information to the user equipment by using a message such as an RRC broadcast message or a DCI message specific to the user equipment.

In this embodiment of the present invention, after the user equipment receives the RAR message sent by the access network device, the user equipment may send an MSG 3 to the access network device and receive an MSG 4 sent by the access network device, to complete random access of the user equipment and further complete initial access of the user equipment.

In the initial access method provided in this embodiment of the present invention, the access network device sends the synchronization signal to the user equipment in different sending timeslots by using a plurality of downlink beams or the access network device sends the synchronization signal to the user equipment at different frequency domain resource locations by using a plurality of downlink beams, and the access network device sends the RAR message to the user equipment by using the plurality of beams. This enhances the synchronization signal and the RAR message, and also improves reliability of receiving the synchronization signal and the RAR message by the user equipment, so as to improve performance of the initial access process of the user equipment in the NR system, and shorten the initial access time of the user equipment.

Optionally, in another embodiment of the present invention, as shown in FIG. 7, before the access network device receives the random access preamble sequence sent by the user equipment, the method further includes the following steps.

S140. The access network device sends information about a relationship between the downlink beam index and an uplink random access resource to the user equipment.

In this embodiment of the present invention, the access network device may send network configuration information to the user equipment by using a broadcast system message (Broadcast System Message), and the network configuration information may include the information about the relationship between the downlink beam index and the uplink random access resource.

The downlink beam index is an index corresponding to a downlink beam in the plurality of downlink beams used by the access network device to send the synchronization signal to the user equipment. In this embodiment of the present invention, each downlink beam index may be uniquely corresponding to one downlink beam.

The uplink random access resource may include one or more of the random access preamble sequence or a random access preamble sequence index, a timeslot for uplink sending of the random access preamble sequence, and an uplink beam index of an uplink sending beam. The uplink sending beam is used by the user equipment to send the random access preamble sequence.

It should be noted that, in this embodiment of the present invention, "uplink" refers to transmission of information from the user equipment to the access network device, and "downlink" refers to transmission of information from the access network device to the user equipment.

It should be further noted that, in this embodiment of the present invention, one uplink beam may also be uniquely determined based on each uplink beam index. In addition, a specific form of the information about the relationship between the downlink beam index and the uplink random access resource may be shown in Table 1.

TABLE 1

| Downlink beam index | Uplink sending timeslot | Random access preamble sequence index | Uplink beam index |
|---|---|---|---|
| B0 | Solt 0 | Preamble 0 | B0' |
| B1 | Solt 1 | Preamble 1 | B1' |
| B2 | Solt 2 | Preamble 2 | B2' |
| B3 | Solt 3 | Preamble 3 | B3' |
| B4 | Solt 4 | Preamble 4 | B4' |

As shown in Table 1, Table 1 merely illustrates an example of the information about the relationship between the downlink beam index and the uplink random access resource, and does not constitute a limitation on a specific form and content of the information about the relationship between the downlink beam index and the uplink random access resource in this embodiment of the present invention.

S150. The user equipment sends the random access preamble sequence to the access network device based on the information about the relationship between the downlink beam index and the uplink random access resource.

In this embodiment of the present invention, the user equipment may specifically send the random access preamble sequence to the access network device based on the synchronization signal in the following several manners.

In an embodiment of the present invention, the information about the relationship between the downlink beam index and the uplink random access resource may be specifically information about a relationship between the downlink beam index and the random access preamble sequence or the random access preamble sequence index. After receiving the synchronization signal sent by the access network device by using the plurality of downlink beams and obtaining the downlink beam index, the user equipment can quickly obtain, from configured relationship information, the random access preamble sequence to be sent by the user equipment, and send the random access preamble sequence to the access network device.

In this embodiment of the present invention, based on the configured information about the relationship between the downlink beam index and the random access preamble sequence or the random access preamble sequence index, the user equipment can use different uplink random access preamble sequences. This can reduce a collision probability of competition random access and shorten the initial access time of the user equipment.

In another embodiment of the present invention, the information about the relationship between the downlink beam index and the uplink random access resource may be specifically information about a relationship between the downlink beam index and the uplink beam index. The user equipment may quickly obtain the to-be-used uplink beam index from the relationship information based on the obtained downlink beam index, and send the random access preamble sequence to the access network device by using the uplink sending beam corresponding to the uplink beam index.

In addition, the user equipment does not need to perform a beam synchronization process. This can greatly improve a random access speed of the user equipment. However, before this embodiment of the present invention is implemented, the access network device needs to determine location information of the user equipment in advance. For example, the access network device may determine location information of user equipment based on a detection signal sent by the user equipment; and the access network device configures, based on the location information of the user equipment, an uplink beam and a downlink beam that are to be used by each user equipment, to form network configuration information; and sends the network configuration information to the user equipment.

In still another embodiment of the present invention, the information about the relationship between the downlink beam index and the uplink random access resource may be specifically information about a relationship between the downlink beam index and the uplink sending timeslot. The user equipment may determine, from the relationship information based on the downlink beam index, a sending timeslot for sending the random access preamble sequence, and send the random access preamble sequence in the uplink sending timeslot.

In this embodiment of the present invention, different user equipments may separately send random access preamble sequences in different timeslots, in other words, processes in which the user equipments send the random access preamble sequences are distinguished from each other in time domain. This reduces a collision probability of different user equipments in random access processes and further shortens an initial access time of the user equipment.

Figure 8:
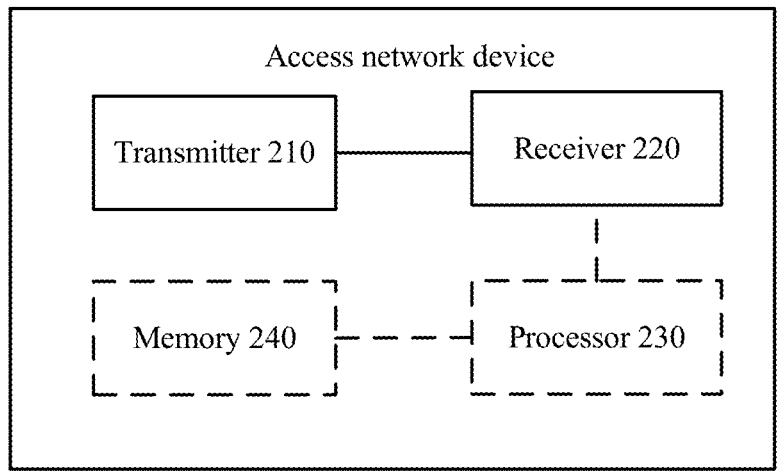
FIG. 8 shows an access network device according to an embodiment of the present invention.

FIG. 8 is an initial access apparatus according to an embodiment of the present invention. The apparatus may be an access network device. The access network device includes a transmitter 210 and a receiver 220.

The transmitter 210 is configured to send a synchronization signal to user equipment by using at least two downlink beams, where the synchronization signal includes downlink beam indexes of the at least two downlink beams.

The receiver 220 is configured to receive a random access preamble sequence sent by the user equipment.

The transmitter 230 is further configured to send a random access response RAR message to the user equipment by using at least two downlink beams, so that the user equipment completes initial access.

When the user equipment initially accesses an NR system, downlink synchronization needs to be first performed. The transmitter 210 of the access network device sends the synchronization signal to the user equipment by using a plurality of different downlink beams, so that the device coarsely implements downlink time synchronization and frequency synchronization and completes the downlink synchronization. The synchronization signal sent by the transmitter 210 may include a downlink beam index of the downlink beam, and the downlink beam is a downlink beam used by the transmitter 210 to send the synchronization signal to the user equipment, so that the user equipment determines, based on the downlink beam index, information such as the random access preamble sequence, or an uplink beam used to send the random access preamble sequence, or a timeslot for sending the random access preamble sequence.

The receiver 220 receives the random access preamble sequence sent by the user equipment, and the transmitter 210 sends the RAR message to the user equipment by using a plurality of downlink beams, to indicate, to the user equipment, that the random access preamble sequence is received, so that the user equipment further completes random access.

For a specific description, refer to descriptions of S110, S120, and S130 in FIG. 1. For brevity of description, details are not described herein again.

The access network device provided in this embodiment of the present invention sends each of the synchronization signal and the RAR message to the user equipment by using a plurality of downlink beams, to enhance the synchronization signal and the RAR message. This improves stability of receiving the synchronization signal and the RAR message by the user equipment, and also improves initial access performance in the NR system, so as to shorten an initial access time, and improve user experience.

Optionally, in an embodiment of the present invention, that the transmitter 210 is configured to send a synchronization signal to user equipment by using at least two downlink beams may specifically include:

the transmitter 210 may send the synchronization signal to the user equipment in a plurality of downlink sending timeslots by using the at least two downlink beams.

Optionally, in an embodiment of the present invention, that the transmitter 210 is configured to send a synchronization signal to user equipment by using at least two downlink beams may specifically include:

the transmitter may send the synchronization signal to the user equipment at a plurality of frequency domain resource locations by using the at least two downlink beams.

In this embodiment of the present invention, the plurality of frequency domain resource locations at which the synchronization signal is sent may be fixed frequency domain resource locations that are preset or preconfigured.

Optionally, in an embodiment of the present invention, the transmitter 210 is further configured to send information about a relationship between the downlink beam index and an uplink random access resource to the user equipment, where the uplink random access resource includes at least one of the random access preamble sequence, a timeslot for uplink sending of the random access preamble sequence, and an uplink beam index of an uplink sending beam, and the uplink sending beam is used by the user equipment to send the random access preamble sequence.

The user equipment sends the random access preamble sequence to the access network device based on the received information about the relationship between the downlink beam index and the uplink random access resource. As described in S150 of FIG. 7, the user equipment determines the to-be-sent random access preamble sequence based on the information about the relationship between the downlink beam index and the uplink random access resource, and different user equipments can use different random access preamble sequences, to reduce a collision probability of competition random access and improve an access speed of the user equipment; or the user equipment quickly determines, based on the downlink beam index, the uplink sending beam for sending the random access preamble sequence, to improve an uplink access speed of the user equipment; or the user equipment determines, based on the downlink beam index, the timeslot for sending the random access preamble sequence, and sends the random access preamble sequence at different moments in time domain, to reduce sending resource collision of the random access preamble sequence, and improve a random access speed of the user equipment, thereby shortening an initial access time of the user equipment, and improving user experience.

For a specific description, refer to the description of S150 in FIG. 7. For brevity of description, details are not described herein again.

Optionally, in an embodiment of the present invention, that the transmitter 210 is configured to send information about a relationship between the downlink beam index and an uplink random access resource to the user equipment may specifically include:

the transmitter 210 may send the information about the relationship between the downlink beam index and the uplink random access resource to the user equipment by using a broadcast message such as RRC or dedicated signaling of the user equipment.

Optionally, in an embodiment of the present invention, the transmitter 210 may send the RAR message in a preset time window by using the at least two downlink beams.

In this embodiment of the present invention, the transmitter 210 may alternatively send the RAR message for a plurality of times in a preset time window.

Optionally, in this embodiment of the present invention, the time window in which the transmitter 210 sends the RAR message to the user equipment and a quantity of times of sending the RAR message by the transmitter 210 to the user equipment in the time window may be set based on configuration information. The configuration information may be sent to the user equipment by using the transmitter 210, to inform the user equipment of time windows in which the access network device sends the RAR message, and/or a quantity of times of sending the RAR message by the access network device in the time window.

In other words, the transmitter 210 is further configured to send the configuration information to the user equipment, where the configuration information may include at least one of information about the plurality of frequency domain resource locations, information about the preset time window, and information about the quantity of times of sending the RAR message in the preset time window.

Optionally, in another embodiment of the present invention, that the transmitter 210 sends a random access response RAR message by using at least two downlink beams may specifically include:

the transmitter 210 may send the RAR message by using at least one transmit receive point, where each of the plurality of transmit receive points sends the RAR message by using a plurality of downlink beams.

Figure 9:
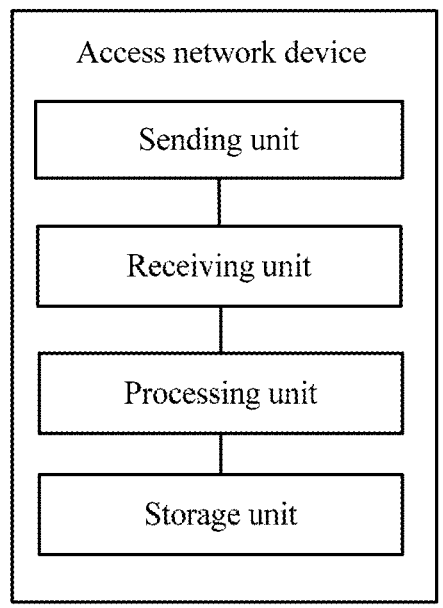
FIG. 9 shows another access network device according to an embodiment of the present invention.

It should be further noted that the transmitter 210 and the receiver 220 in the access network device provided in this embodiment of the present invention can implement, by executing corresponding software, methods/steps performed by the access network devices in FIG. 1 or FIG. 7. If implemented by software, the methods/steps may be implemented by using a corresponding functional unit/functional module. As shown in FIG. 9, the access network device may include: a receiving unit, a sending unit, a processing unit, and a storage unit. The receiving unit and the sending unit are configured to perform wired or wireless communication with the user equipment.

In addition, the access network device provided in this embodiment of the present invention may further include a processor 230 and a memory 240. The processor 230 is configured to process information received by the transmitter 210 and information to be sent by the receiver 220, and the memory 240 is configured to store a program instruction and data that are necessary for the access network device.

Figure 10:
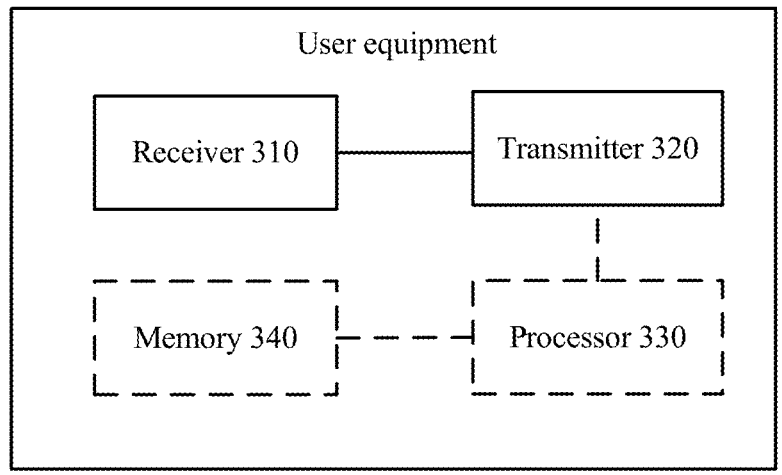
FIG. 10 shows user equipment according to an embodiment of the present invention.

FIG. 10 is an initial access apparatus according to an embodiment of the present invention. The apparatus may be user equipment. As shown in FIG. 10, the user equipment may include a receiver 310 and a transmitter 320.

The receiver 310 is configured to receive a synchronization signal sent by an access network device by using at least two downlink beams, where the synchronization signal includes downlink beam indexes of the at least two downlink beams.

The transmitter 320 is configured to send a random access preamble sequence to the access network device based on the synchronization signal.

The receiver 310 is further configured to receive a random access response RAR message sent by the access network device by using at least two downlink beams, so that the user equipment completes initial access.

The user equipment receives the synchronization signal sent by the access network device by using a plurality of downlink beams, completes downlink synchronization based on the synchronization signal, and sends the random access preamble sequence to the access network device, so that the access network device sends the RAR message to the user equipment after receiving the random access preamble sequence. The user equipment receives the RAR message sent by the access network device by using the plurality of downlink beams. For a specific description, refer to descriptions of S110, S120, and S130 in FIG. 1. For brevity of description, details are not described herein again.

The user equipment provided in this embodiment of the present invention receives the synchronization signal and the RAR message each of which is sent by the access network device by using a plurality of downlink beams, to enhance the synchronization signal and the RAR message. This improves stability of receiving the synchronization signal and the RAR message by the user equipment, and also improves initial access performance in the NR system, so as to shorten the initial access time, and improve user experience.

Optionally, in an embodiment of the present invention, the receiver 310 may be configured to receive the synchronization signal sent by the access network device in a plurality of downlink sending timeslots by using the at least two downlink beams.

Optionally, in an embodiment of the present invention, the receiver 310 may be configured to receive the synchronization signal sent by the access network device at a plurality of frequency domain resource locations by using the at least two downlink beams.

Optionally, in this embodiment of the present invention, the plurality of frequency domain resource locations may be preset fixed frequency domain resource locations. The frequency domain resource location may be configured by the access network device. For example, the access network device sends information about the plurality of configured fixed frequency domain resource locations to the user equipment in a form of configuration information.

Optionally, in an embodiment of the present invention, the receiver 310 is further configured to receive information that is about a relationship between the downlink beam index and an uplink random access resource and that is sent by the access network device.

Optionally, in this embodiment of the present invention, the information about the relationship between the downlink beam index and the uplink random access resource may be sent by the access network device by using a broadcast message or dedicated signaling of the user equipment. The receiver 310 receives the information about the relationship between the downlink beam index and the uplink random access resource.

The uplink random access resource may include information such as the random access preamble sequence or a random access preamble sequence index, a timeslot for uplink sending of the random access preamble sequence, or an uplink beam index of an uplink sending beam.

Optionally, in an embodiment of the present invention, the transmitter 320 is further configured to send the random access preamble sequence to the access network device based on the synchronization signal and the information about the relationship between the downlink beam index and the uplink random access resource.

Optionally, in an embodiment of the present invention, the user equipment may further include a processor 330. That the transmitter 320 is configured to send the random access preamble sequence to the access network device based on the synchronization signal and the information about the relationship between the downlink beam index and the uplink random access resource may specifically include:

the processor 330 is configured to determine, based on information about a relationship between the downlink beam index in the synchronization signal and the random access preamble sequence or the random access preamble sequence index, the random access preamble sequence to be sent by the user equipment to the access network device; and the transmitter is configured to send the random access preamble sequence to the access network device.

For a specific description of this process, refer to a specific description of S150 in FIG. 7. For brevity of description, details are not described herein again.

Optionally, in an embodiment of the present invention, the processor 330 is configured to determine, based on the synchronization message and information about a relationship between the downlink beam index and the timeslot for uplink sending of the random access preamble sequence, a timeslot for sending the random access preamble sequence. The transmitter is configured to send the random access preamble sequence in the timeslot.

For a specific description of this process, refer to a specific description of S150 in FIG. 7. For brevity of description, details are not described herein again.

Optionally, in an embodiment of the present invention, the processor 330 is configured to determine an uplink sending beam based on information about a relationship between the downlink beam index in the synchronization message and the uplink beam index of the uplink sending beam. The transmitter is configured to send the random access preamble sequence by using the uplink sending beam.

Optionally, in an embodiment of the present invention, the receiver 310 is configured to receive configuration information sent by the access network device, where the configuration information includes at least one of information about the plurality of frequency domain resource locations, information about a preset time window, and information about a quantity of times of receiving the RAR message in the preset time window.

Optionally, in an embodiment of the present invention, that the receiver 310 is configured to receive a random access response RAR message sent by the access network device by using at least two downlink beams may specifically include:

the receiver 310 is configured to receive the RAR message sent by the access network device in the preset time window by using the at least two downlink beams.

Optionally, in an embodiment of the present invention, that the receiver 310 is configured to receive the RAR message sent by the access network device in the preset time window by using the at least two downlink beams may specifically include:

the receiver 310 is configured to receive the RAR message sent by the access network device for a plurality of times in the preset time window.

Optionally, in an embodiment of the present invention, that the receiver 310 is configured to receive a random access response RAR message sent by the access network device by using at least two downlink beams may specifically include: the receiver 310 is configured to receive the RAR message sent by the access network device by using a plurality of transmit receive points, where each of the plurality of transmit receive points sends the RAR message by using at least two downlink beams.

Figure 11:
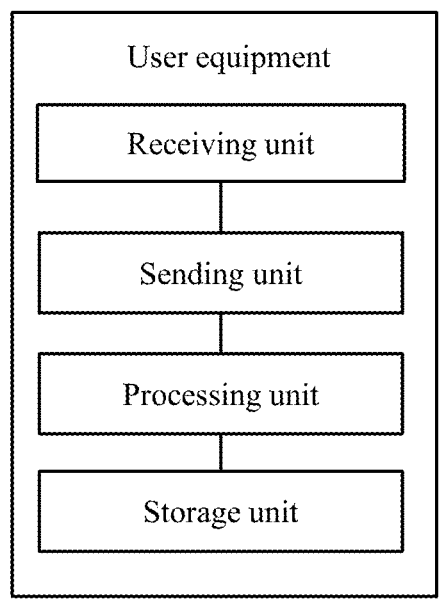
FIG. 11 shows another user equipment according to an embodiment of the present invention.

It should be further noted that the receiver 310 and the transmitter 320 in the user equipment provided in this embodiment of the present invention can implement, by executing corresponding software, methods/steps performed by the user equipment in FIG. 1 or FIG. 7. If implemented by software, the methods/steps may be implemented by using a corresponding functional unit/functional module. As shown in FIG. 11, the user equipment may include: a receiving unit, a sending unit, a processing unit, and a storage unit. The receiving unit and the sending unit are configured to perform wired or wireless communication with the access network device.

In addition, the user equipment provided in this embodiment of the present invention may further include a processor 330 and a memory 340. The processor 330 is configured to process information received by the transmitter 310 and information received by the receiver 310, and the memory 340 is configured to store a program instruction and data that are necessary for the access network device.

An embodiment of the present invention provides a computer storage medium, configured to store a computer software instruction used by the foregoing access network device. The computer software instruction includes a program designed for execution by the foregoing access network device.

An embodiment of the present invention provides a computer storage medium, configured to store a computer software instruction used by the foregoing user equipment. The computer software instruction includes a program designed for execution by the foregoing user equipment.

It should be understood that, a processor 230/330 in the access network device provided in FIG. 8 or the user equipment provided in FIG. 10 may be a central processing unit (Central Processing Unit, CPU), or may be another general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or a transistor logic device, a discrete hardware component, or the like. The general purpose processor may be a microprocessor, or the processor may be any conventional processor or the like.

In an implementation process, each step of the foregoing methods may be completed by using an integrated logic circuit of hardware in the processor 230/330 or an instruction in a form of software. The steps of the methods disclosed with reference to the embodiments of the present invention may be directly performed and completed by a hardware processor, or may be performed and completed by a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor 230/330 reads information in the memory and completes the steps in the foregoing methods in combination with hardware of the processor. To avoid repetition, details are not described herein.

The memory 240/340 may include a read-only memory and a random access memory, and provide the instruction and data to the processor 230/330. A part of the memory may further include a nonvolatile random access memory.

In the several embodiments provided in the present invention, it should be understood that the disclosed system, base station, local grooming controller, gateway, and data transmission method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms. The units described as separate parts may or may not be physically separate, and parts displayed as units may or may not be physical units, may be located in one position, or may be distributed on a plurality of network units. A part or all of the units may be selected based on actual needs to achieve the objectives of the solutions of the embodiments of the present invention. In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An initial access apparatus, wherein the apparatus is an access network device, and the access network device comprises:
a transmitter, configured to send a synchronization signal to user equipment by using at least two downlink beams of a plurality of downlink beams, wherein the synchronization signal comprises downlink beam indexes of the at least two downlink beams; and
a receiver, configured to receive a random access preamble sequence sent by the user equipment, wherein
the transmitter is further configured to send a random access response (RAR) message to the user equipment by simultaneously using at least two downlink beams selected according to a beam diversity mechanism from the plurality of downlink beams, so that the user equipment completes initial access.

2. The apparatus according to claim 1, wherein that a transmitter is configured to send a synchronization signal to user equipment by using at least two downlink beams comprises:
the transmitter is configured to send the synchronization signal to the user equipment in a plurality of downlink sending timeslots by using the at least two downlink beams used to send the synchronization signal.

3. The apparatus according to claim 1, wherein that a transmitter is configured to send a synchronization signal to user equipment by using at least two downlink beams specifically comprises:
the transmitter is configured to send the synchronization signal to the user equipment at a plurality of frequency domain resource locations by using the at least two downlink beams used to send the synchronization signal.

4. The apparatus claim 1, wherein the transmitter is further configured to send information about a relationship between a downlink beam index of one of the at least two downlink beams used to send the synchronization signal and an uplink random access resource to the user equipment, wherein the uplink random access resource comprises at least one of the random access preamble sequence, a timeslot for uplink sending of the random access preamble sequence, and an uplink beam index of an uplink sending beam, and the uplink sending beam is used by the user equipment to send the random access preamble sequence.

5. The apparatus according to claim 4, wherein that the transmitter is configured to send information about a relationship between the downlink beam index and an uplink random access resource to the user equipment comprises:
the transmitter is configured to send the information about the relationship between the downlink beam index and the uplink random access resource to the user equipment by using a broadcast message or dedicated signaling of the user equipment.

6. The apparatus claim 1, wherein that the transmitter is configured to send a RAR message by simultaneously using at least two downlink beams comprises:
the transmitter is configured to send the RAR message in a preset time window by using the at least two downlink beams selected according to a beam diversity mechanism from the plurality of downlink beams.

7. The apparatus according to claim 6, wherein the sending the RAR message in a preset time window comprises:
sending the RAR message for a plurality of times in the preset time window.

8. The apparatus claim 1, wherein that the transmitter sends a RAR message by simultaneously using at least two downlink beams comprises:
the transmitter is configured to send the RAR message by using at least one transmit receive point, wherein the at least one transmit receive point sends the RAR message by using two or more of the plurality of downlink beams.

9. The apparatus claim 1, wherein the transmitter is further configured to send configuration information to the user equipment, wherein the configuration information comprises at least one of information about a plurality of frequency domain resource locations, information about a preset time window, and information about a quantity of times of sending the RAR message in the preset time window.

10. An initial access apparatus, wherein the apparatus is user equipment, and the user equipment comprises:
a receiver, configured to receive a synchronization signal sent by an access network device by using at least two downlink beams of a plurality of downlink beams, wherein the synchronization signal comprises downlink beam indexes of the at least two downlink beams; and
a transmitter, configured to send a random access preamble sequence to the access network device based on the synchronization signal, wherein
the receiver is further configured to receive a random access response (RAR) message sent by the access network device by simultaneously using at least two downlink beams selected according to a beam diversity mechanism from the plurality of downlink beams.

11. The apparatus according to claim 10, wherein that a receiver is configured to receive a synchronization signal sent by an access network device by simultaneously using at least two downlink beams specifically comprises:
the receiver is configured to receive the synchronization signal sent by the access network device in a plurality of downlink sending timeslots by using the at least two downlink beams used to send the synchronization signal.

12. The apparatus according to claim 10, wherein that a receiver is configured to receive a synchronization signal sent by an access network device by using at least two downlink beams comprises:
the receiver is configured to receive the synchronization signal sent by the access network device at a plurality of frequency domain resource locations by using the at least two downlink beams used to send the synchronization signal.

13. The apparatus claim 10, wherein
the transmitter is further configured to send the random access preamble sequence to the access network device based on the synchronization signal and information about a relationship between a downlink beam index of said downlink beam indexes and an uplink random access resource,
the uplink random access resource comprises the random access preamble sequence or a random access preamble sequence index; and the apparatus further comprises at least one processor, and that the transmitter is configured to send the random access preamble sequence to the access network device based on the synchronization signal and information about a relationship between the downlink beam index and an uplink random access resource comprises:
the processor is configured to determine, based on information about a relationship between the synchronization signal and the random access preamble sequence or the random access preamble sequence index, the random access preamble sequence to be sent by the user equipment to the access network device; and
the transmitter is configured to send the random access preamble sequence to the access network device.

14. The apparatus according to claim 13, wherein the uplink random access resource comprises a timeslot for uplink sending of the random access preamble sequence, wherein
the at least one processor is configured to determine, based on the synchronization message and the information about a relationship between the downlink beam index and the timeslot for uplink sending of the random access preamble sequence, a timeslot for sending the random access preamble sequence; and
the transmitter is configured to send the random access preamble sequence in the timeslot.

15. The apparatus according to claim 13, wherein the uplink random access resource comprises an uplink beam index of an uplink sending beam, wherein
the at least one processor is configured to determine the uplink sending beam based on the synchronization message and the information about a relationship between the downlink beam index and the uplink beam index of the uplink sending beam; and
the transmitter is configured to send the random access preamble sequence by using the uplink sending beam.

16. The apparatus according to claim 13, wherein the receiver is further configured to receive the information about the relationship between the downlink beam index and the uplink random access resource sent by the access network device.

17. The apparatus according to claim 10, wherein that the receiver is configured to receive a RAR message sent by the access network device by using at least two downlink beams specifically comprises:
the receiver is configured to receive the RAR message sent by the access network device in a preset time window by using the at least two downlink beams used to send the synchronization signal;
the receiver is configured to receive the RAR message sent by the access network device in a preset time window by using the at least two downlink beams comprises:
the receiver is configured to receive the RAR message sent by the access network device for a plurality of times in the preset time window.

18. The apparatus claim 10, wherein that the receiver is configured to receive a RAR message sent by the access network device by using at least two downlink beams specifically comprises:

the receiver is configured to receive the RAR message sent by the access network device by using a plurality of transmit receive points, wherein each of the plurality of transmit receive points sends the RAR message by using at least two downlink beams of the plurality of downlink beams.

19. The apparatus claim 15, wherein that the receiver is configured to receive the information about the relationship between the downlink beam index and the uplink random access resource sent by the access network device specifically comprises:
the receiver is configured to receive the information about the relationship between the downlink beam index and the uplink random access resource by using a broadcast message or dedicated signaling of the user equipment.

20. The apparatus according to claim 10, wherein
the receiver is configured to receive configuration information sent by the access network device, wherein the configuration information comprises at least one of information about a plurality of frequency domain resource locations, information about the preset time window, and information about a quantity of times of receiving the RAR message in the preset time window.

* * * * *